United States Patent
Shirai (10) Patent No.: US 10,376,977 B2
(45) Date of Patent: Aug. 13, 2019

(54) CONTROL DEVICE, WIRE ELECTRICAL DISCHARGE MACHINE, PROGRAM EDITING APPARATUS, AND CONTROL METHOD

(71) Applicant: FANUC CORPORATION, Yamanashi (JP)

(72) Inventor: Kenichirou Shirai, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/946,205

(22) Filed: Apr. 5, 2018

(65) Prior Publication Data

US 2018/0290223 A1   Oct. 11, 2018

(30) Foreign Application Priority Data

Apr. 7, 2017  (JP) ................. 2017-076719

(51) Int. Cl.
*B23H 7/18* (2006.01)
*B23H 7/20* (2006.01)
(Continued)

(52) U.S. Cl.
CPC ............... *B23H 7/20* (2013.01); *B23H 7/18* (2013.01); *G05B 19/4093* (2013.01); *G05B 19/4097* (2013.01); *G05B 2219/35072* (2013.01); *G05B 2219/35357* (2013.01); *G05B 2219/36097* (2013.01); *G05B 2219/36218* (2013.01); *G05B 2219/45043* (2013.01); *G05B 2219/45221* (2013.01); *Y02P 90/265* (2015.11)

(58) Field of Classification Search
CPC ... B23H 7/18; B23H 7/20; B23H 7/22; B23H 1/02; B23H 7/04; G05B 19/4093; G05B 19/4097; G05B 2219/35072; G05B 2219/35357; G05B 2219/36097; G05B 2219/36218; G05B 2219/45043; G05B 2219/45221; G05B 19/18; Y02P 90/265

See application file for complete search history.

(56) References Cited

U.S. PATENT DOCUMENTS

2015/0094845 A1* 4/2015 Inukai .................. B23H 7/04
                                                        700/162

FOREIGN PATENT DOCUMENTS

EP    2684633 A2   1/2014
JP     916238 A    1/1997
(Continued)

OTHER PUBLICATIONS

English Abstract and Machine Translation for Japanese Publication No. 09-016238 A, published Jan. 17, 1997, 11 pgs.
(Continued)

*Primary Examiner* — Kenneth M Lo
*Assistant Examiner* — Chad G Erdman
(74) *Attorney, Agent, or Firm* — Fredrikson & Byron, P.A.

(57) ABSTRACT

A control device includes: a control unit configured to control a main processing machine by replacing a machining shape on a machining surface of a workpiece specified in a program with a shape corresponding to an enlargement/reduction ratio and replacing a fixing distance for a core specified in the program with a distance corresponding to the enlargement/reduction ratio for the machining shape of the workpiece and a plate thickness ratio between the workpieces.

10 Claims, 8 Drawing Sheets

(51) Int. Cl.
G05B 19/4093 (2006.01)
G05B 19/4097 (2006.01)

(56) References Cited

FOREIGN PATENT DOCUMENTS

| JP | 944220 A | | 2/1997 | |
|---|---|---|---|---|
| JP | 2013144335 | * | 1/2012 | ............... B23H 7/02 |
| JP | 201424132 | | 2/2014 | |
| JP | 5813517 B2 | | 11/2015 | |

OTHER PUBLICATIONS

Extended European Search Report dated Sep. 10, 2018 for related European Patent Application No. 18165999.6, 5 pgs.
English Abstract and Machine Translation for Japanese Publication No. 5813517 B2, published Nov. 17, 2015, 9 pgs.
English Abstract and Machine Translation for Japanese Publication No. 2014-024132 A, published Feb. 6, 2014, 15 pgs.
English Abstract and Machine Translation for Japanese Publication No. 09-044220 A, published Feb. 14, 1997, 7 pgs.

* cited by examiner

PLATE THICKNESS:H1

FIG. 4B

PLATE THICKNESS:H2 (=H1×2)
D2=D1×4

CONTROL DEVICE, WIRE ELECTRICAL DISCHARGE MACHINE, PROGRAM EDITING APPARATUS, AND CONTROL METHOD

CROSS-REFERENCE TO RELATED APPLICATION

This application is based upon and claims the benefit of priority from Japanese Patent Application No. 2017-076719 filed on Apr. 7, 2017, the contents of which are incorporated herein by reference.

BACKGROUND OF THE INVENTION

Field of the Invention

The present invention relates to a control device, a wire electrical discharge machine, a program editing apparatus, and a control method that securely fix and hold a core in a workpiece.

Description of the Related Art

Japanese Patent No. 5813517 discloses a machining program generator for generating a program which, based on the shape data of a core, sets deposition regions where the wire electrode component is deposited to the core so as to perform electrical discharge machining with the wire electrode's component deposited to the designated deposition areas.

Japanese Laid-Open Patent Publication No. 09-044220 discloses a CNC technique in which, when a workpiece is machined according to an enlarged or reduced machining shape, a wire electrical discharge machine is controlled by converting movement commands of a program according to an enlargement/reduction ratio and executing the program.

SUMMARY OF THE INVENTION

In a case where the commands in the machining program generated by the technique described in Japanese Patent No. 5813517 are converted in conformity with the enlargement/reduction ratio of the machining shape by using the technique described in Japanese Laid-Open Patent Publication No. 09-044220, the deposition regions (fixing portions) are also converted according to the enlargement/reduction ratio of the machining shape. That is, since the fixing portions are converted without considering the thickness of the workpiece, there is a risk that the fixing force of the core at the fixed points is not strong enough when the wire electrical discharge machine is controlled by executing the aforementioned program by the CNC (controller).

The present invention has been devised in order to solve the above problem, it is therefore an object of the present invention to provide a control device, a wire electrical discharge machining device, a program editor, and a control method that enable a core to be fixed with appropriate fixing force.

The aspect of the present invention resides in a control device for controlling a main processing machine in accordance with a program where a plate thickness of a workpiece is a first plate thickness, and includes: a program storage unit configured to store a program for specifying a machining shape on a machining surface of the workpiece and a fixing distance of a fixing portion that fixes a core to be formed by machining the workpiece to the workpiece, on a machining line between the workpiece and the core; an enlargement/reduction ratio setter configured to set an enlargement/reduction ratio of the machining shape of the workpiece; a plate thickness setter configured to set a second plate thickness as the plate thickness of the workpiece to be processed by the main processing machine; a plate thickness ratio calculator configured to calculate a ratio of the second plate thickness to the first plate thickness as a plate thickness ratio; and a control unit configured to control the main processing machine by replacing the machining shape specified in the program with a shape corresponding to the enlargement/reduction ratio and replacing the fixing distance specified in the program with a distance corresponding to the enlargement/reduction ratio and the plate thickness ratio.

According to the present invention, it is possible to produce an appropriate fixing force for cores.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Now, the present invention will be detailed by describing embodiments of the invention. The following embodiments will not limit the claimed invention. Not all combinations of features described in the embodiments are necessarily essential to the solving means of the invention.

First Embodiment

[Configuration of Wire Electrical Discharge Machine]

Figure 1:
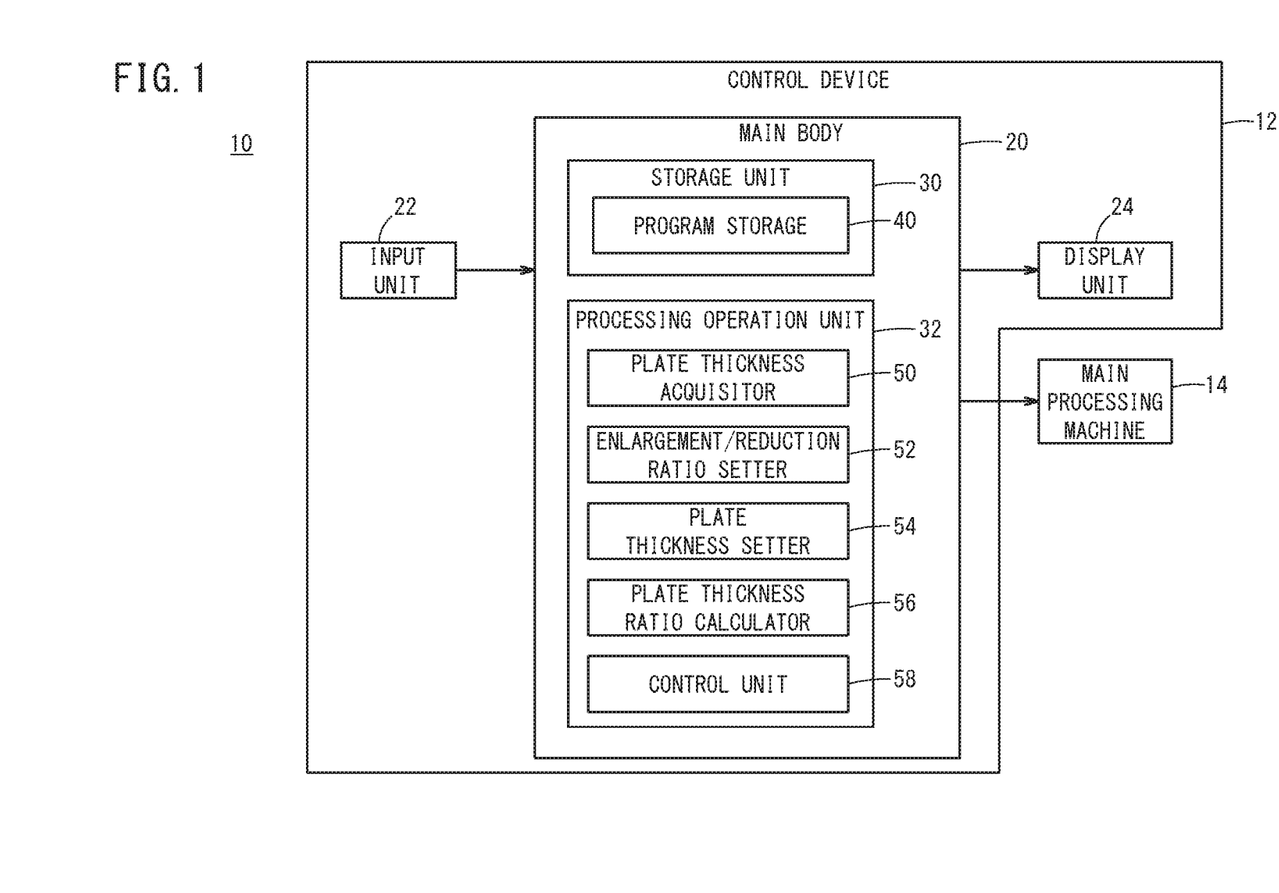
FIG. 1 is a block diagram showing a configuration of a wire electrical discharge machine.
Figure 2:
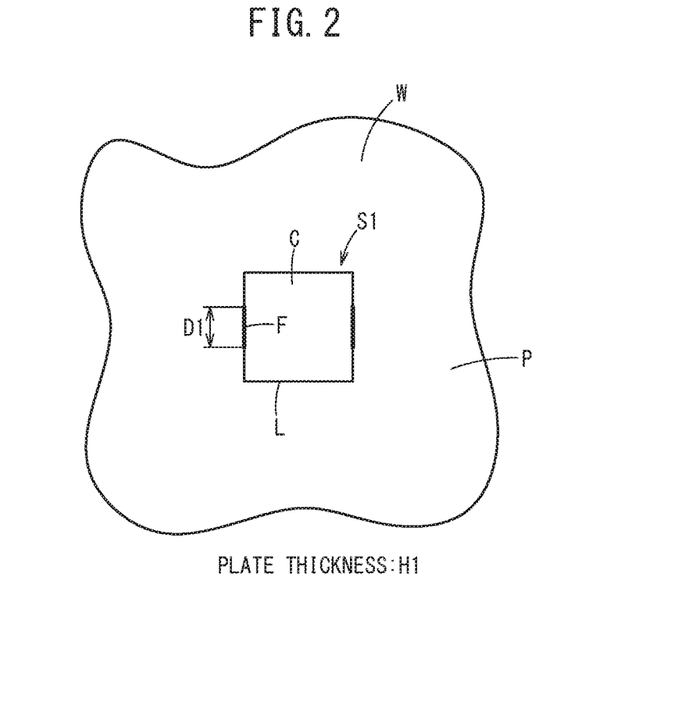
FIG. 2 is a schematic diagram showing a machining shape of a workpiece specified in an NC program.

FIG. 1 is a block diagram showing a configuration of a wire electrical discharge machine 10 according to present embodiment. FIG. 2 is a schematic diagram showing a machining shape S1 of a workpiece W specified in an NC program.

The wire electrical discharge machine 10 includes a control device 12 and a main processing machine 14. The control device 12 controls the main processing machine 14 in accordance with a NC program created beforehand. The main processing machine 14 performs electrical discharge machining on the workpiece W in accordance with command signals from the control device 12.

The control device 12 includes a main body 20, an input unit 22, and a display unit 24. The main body 20 includes a storage unit 30 and a processing operation unit 32. The storage unit 30 is a hard disk, a semiconductor memory, and the like and stores various kinds of data, NC programs, and others. The processing operation unit 32 is composed of a processor, a memory, and the like and performs various kinds of processing, calculations, and others. The input unit 22 may include, for example, a keyboard, a mouse, a touch panel, and the like. An operator operates the input unit 22 to input characters, symbols, numerals, etc., designate a position on the display unit 24, and select an icon or the like displayed on the display unit 24. The display unit 24 may be, for example, a liquid crystal display or the like, and can display characters, symbols, numerals, images, and the like on the screen.

The storage unit 30 has a program storage 40. The program storage 40 stores an NC program with which the main processing machine 14 operates. The NC program specifies a machining shape S1 on a machining surface P of the workpiece W shown in FIG. 2. The NC program also specifies a fixing distance D1 on a machining line L for a fixing portion F where a core C formed by machining the workpiece W is fixed to the workpiece W. Further, the NC program has information on a plate thickness H1 of the workpiece W set in the NC program.

The processing operation unit 32 includes a plate thickness acquisitor 50, an enlargement/reduction ratio setter 52, a plate thickness setter 54, a plate thickness ratio calculator 56, and a control unit 58. The plate thickness acquisitor 50 retrieves the information on the plate thickness H1 of the workpiece W set in the NC program from the NC program stored in the program storage 40. The enlargement/reduction ratio setter 52 sets a ratio for enlarging or reducing the machining shape S1 specified in the NC program. That is, the operator operates the input unit 22 to input a value in an unillustrated enlargement/reduction ratio setting field displayed on the display unit 24 and then the enlargement/reduction ratio setter 52 sets a value as an enlargement/reduction ratio Ms.

Further, the operator operates the input unit 22 to input a value in an unillustrated plate thickness setting field displayed on the display unit 24, and then the plate thickness setter 54 sets the value for a plate thickness H2. Normally, in the plate thickness setting field, the actual plate thickness of the workpiece W to be machined by the main processing machine 14 is entered. The plate thickness ratio calculator 56 calculates the ratio of the plate thickness H2 to the plate thickness H1 as a plate thickness ratio Mh (Mh=H2/H1). The control unit 58 reads the NC program according to the enlargement/reduction ratio Ms and the plate thickness ratio Mh, executes the NC program, and controls the main processing machine 14.

[Process in Processing Operation Unit]

Figure 3:
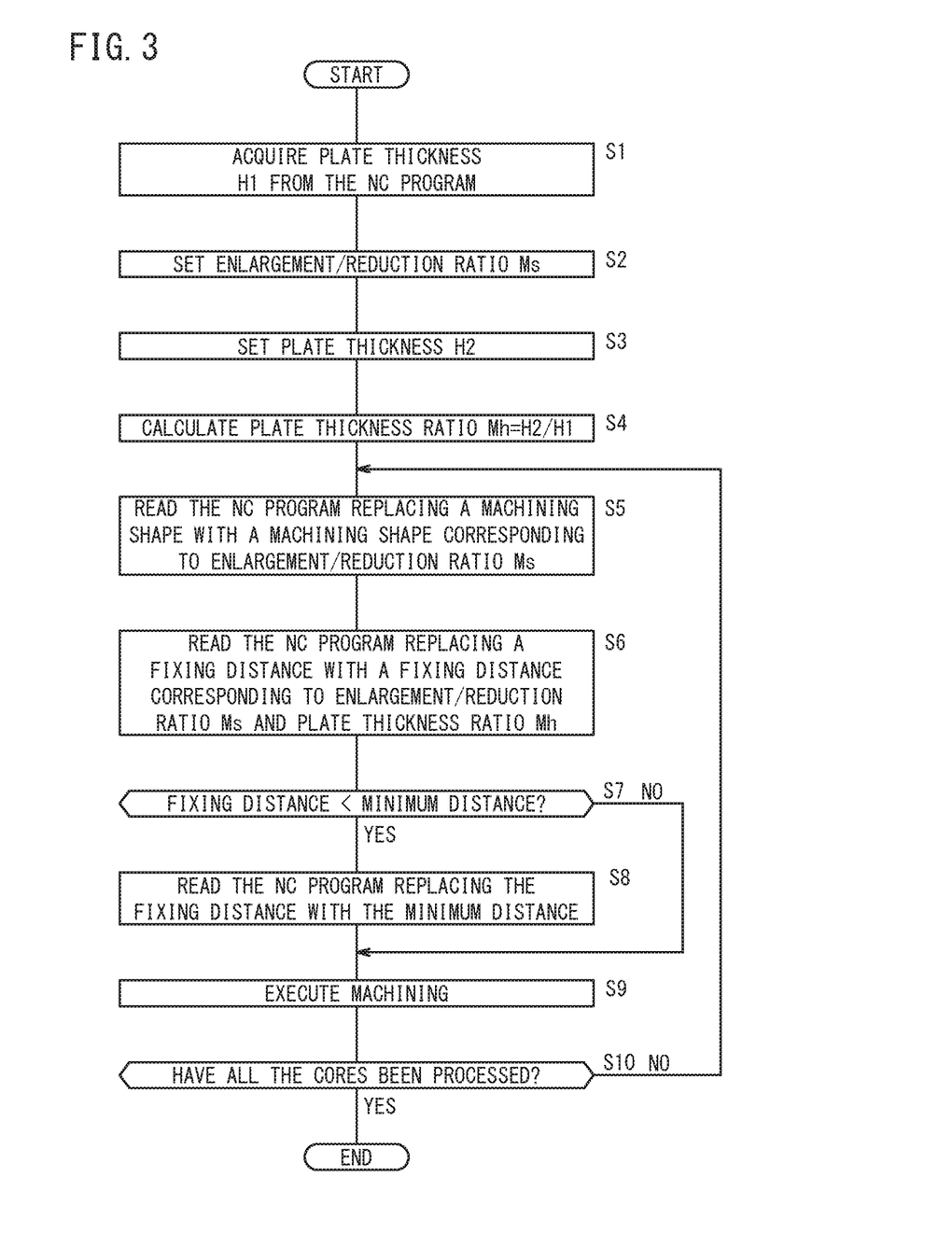
FIG. 3 is a flowchart showing the flow of processing performed in a processing operation unit.

FIG. 3 is a flowchart showing the flow of processes performed in the processing operation unit 32. At step S1, the thickness acquisitor 50 acquires the plate thickness H1 of the workpiece W from the NC program stored in the program storage 40, and the control goes to step S2. At step S2, the enlargement/reduction ratio setter 52 sets the enlargement/reduction ratio Ms, and the control goes to step S3. At step S3, the plate thickness H2 is set in the plate thickness setter 54, and the control goes to step S4. At step S4, the plate thickness ratio calculator 56 calculates the plate thickness ratio Mh (=H2/H1), and the control goes to step S5.

At step S5, the control unit 58 reads the NC program replacing the machining shape S1 with a machining shape S2 that is equal to Ms times the machining shape S1 specified in the NC program, and the control goes to step S6. At step S6, the control unit 58 reads the NC program replacing the fixing distance D1 of the fixing portion F specified in the NC program with a fixing distance D2 which is equal to (Ms×Mh) times the fixing distance D1. Then, the process goes to step S7.

At step S7, the control unit 58 determines whether or not the fixing distance D2 after scaling is shorter than a predetermined minimum distance Dmin. When the fixing distance D2 is shorter than the minimum distance Dmin, the control goes to step S8. When the fixing distance D2 is equal to or greater than the minimum distance Dmin, the control goes to step S9. At step S8, the control unit 58 reads the NC program replacing the fixing distance D1 specified in the NC program with the minimum distance Dmin, and the control goes to step S9.

At step S9, the control unit 58 runs the NC program and outputs command signals to the main processing machine 14. At step S10, when multiple cores C are formed in the workpiece W, the control unit 58 judges whether or not all the cores C have been machined. When machining of all the cores C has not been completed, the control goes to step S5, and when all the cores C have been machined, the control is terminated.

[Specific Example of Partial Replacement of Program after Scaling the Machining Shape]

(At the Time of Enlargement)

Figure 4A:
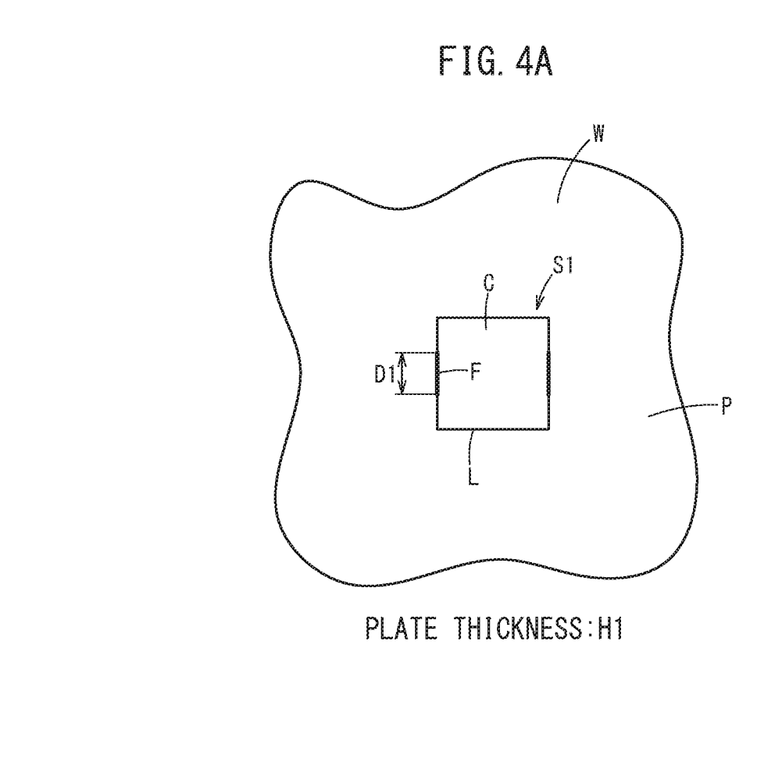
FIG. 4A is a schematic diagram showing a machining shape of a workpiece specified in an NC program.
Figure 4B:
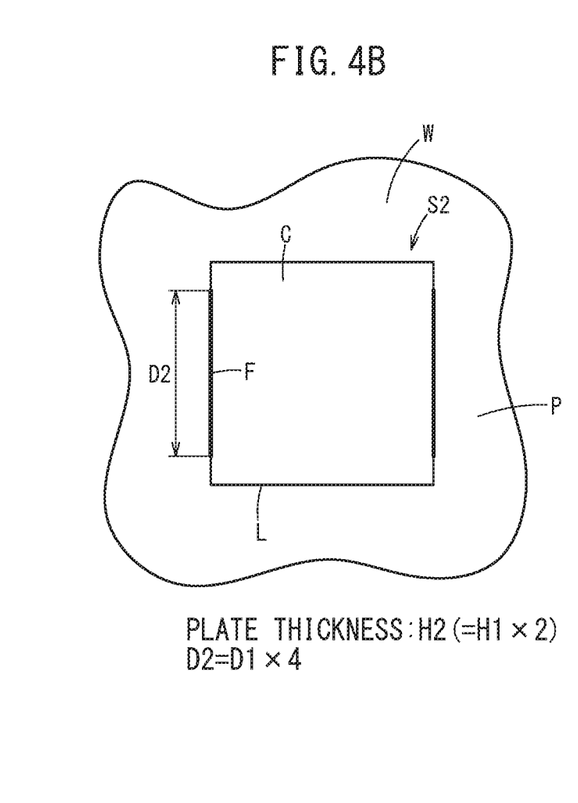
FIG. 4B is a schematic diagram showing a machining shape obtained by enlarging the machining shape of the workpiece defined in the NC program by 2 times.

A specific example of a machining shape S2 after enlarging a machining shape S1 specified in an NC program will be described. FIG. 4A is a schematic diagram showing a machining shape S1 of a workpiece W specified in an NC program. FIG. 4B is a schematic diagram showing a machining shape S2 that is obtained by enlarging the machining shape S1 by two times. It is assumed that the plate thickness H2 of the workpiece W set in the plate thickness setter 54 is twice the plate thickness H1 of the workpiece W set in the NC program.

At this time, the control unit 58 reads the NC program replacing the machining shape S1 specified in the NC program with the machining shape S2 that is a doubled machining shape S1 while the corresponding fixing portion is replaced with a fixing distance D2 that is four times the fixing distance D1 of the fixing portion F specified in the NC program.

(At the Time of Reduction)

Figure 5A:
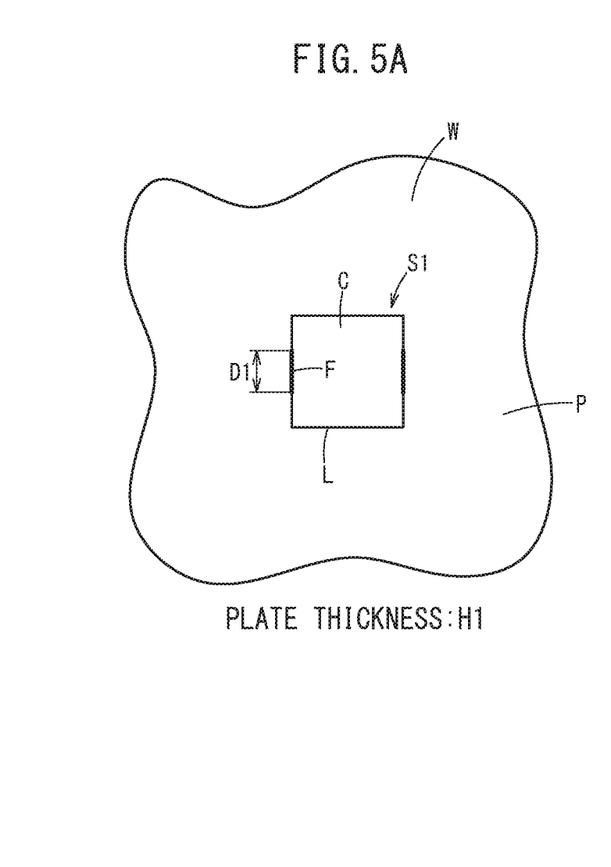
FIG. 5A is a schematic diagram showing a machining shape of a workpiece specified in an NC program.
Figure 5B:
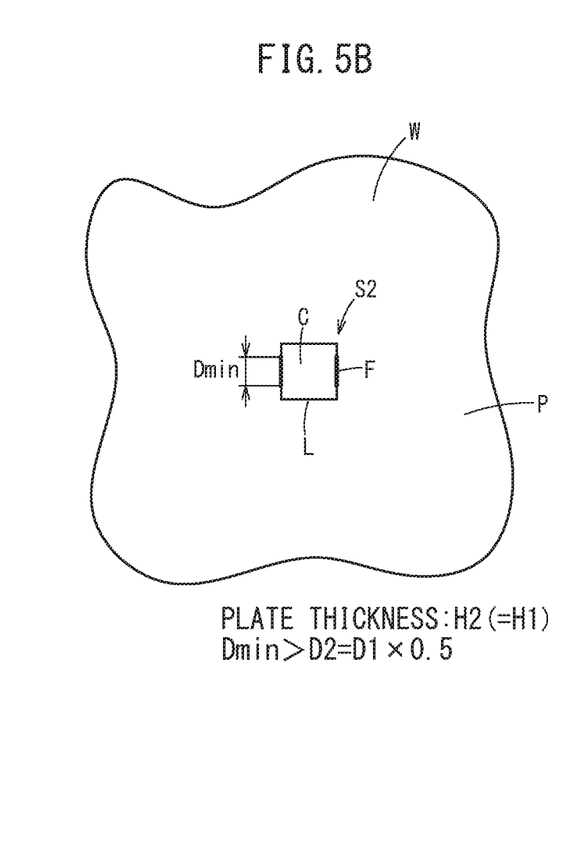
FIG. 5B is a schematic diagram showing a machining shape obtained by reducing the machining shape of the workpiece defined in the NC program by 0.5 times.

A specific example of a machining shape S2 after reducing a machining shape S1 specified in an NC program will be described. FIG. 5A is a schematic diagram showing a machining shape S1 of a workpiece W specified in an NC program. FIG. 5B is a schematic diagram showing a machining shape S2 that is obtained by reducing the machining shape S1 by half (0.5 times). It is assumed that the plate thickness H2 of the workpiece W set in the plate thickness setter 54 is the same as the plate thickness H1 of the workpiece W set in the NC program.

At this time, the control unit 58 reads the NC program replacing the machining shape S1 specified in the NC program with the machining shape S2 that is half the machining shape S1 while also replacing the fixing distance D1 of the fixing portion F specified in the NC program with a fixing distance D2 that is equal to the fixing distance D1 times 0.5. Here, in the example of FIG. 5B, the fixing distance D2 is shorter than the minimum distance Dmin. In this case, the control unit 58 reads the NC program by replacing the fixing distance D1 specified in the NC program with the minimum distance Dmin.

[Operation and Effect]

There has been a conventional practice that, when it is desirable to machine a workpiece to have a machining shape S2 that is an enlarged or reduced shape of a machining shape S1 on a machining surface P of the workpiece W specified by an NC program, the control device 12 reads the commands in the NC program according to the enlargement/reduction ratio Ms of the machining shape S2 to the machining shape S1, to thereby control the main processing machine 14. This configuration enables the operator to machine the workpiece W to obtain the machining shape S2 with the main processing machine 14 without the need of rewriting the NC program. However, since the machining shape S1 on the machining surface P of the workpiece W alone is scaled up or down, this conventional technique entails the problem below.

Figure 6A:
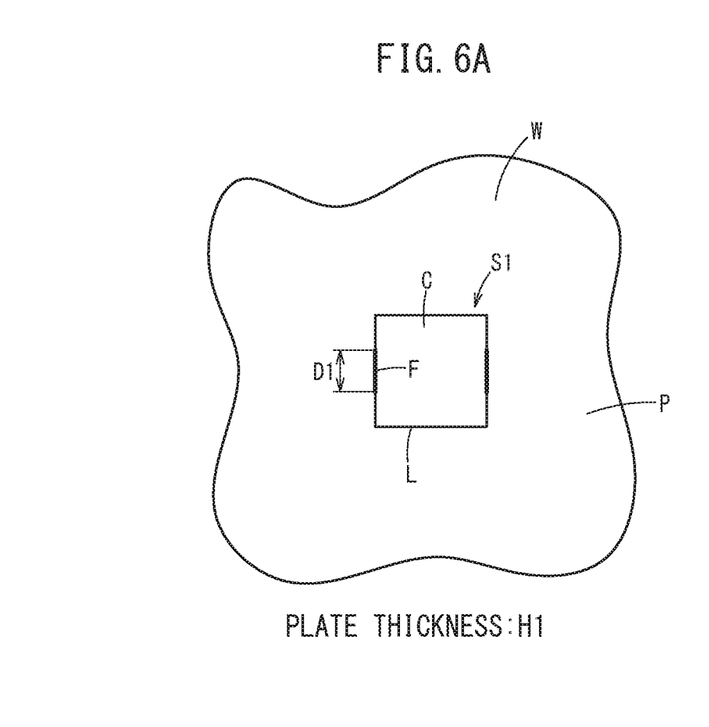
FIG. 6A is a schematic diagram showing a machining shape of a workpiece specified in an NC program.
Figure 6B:
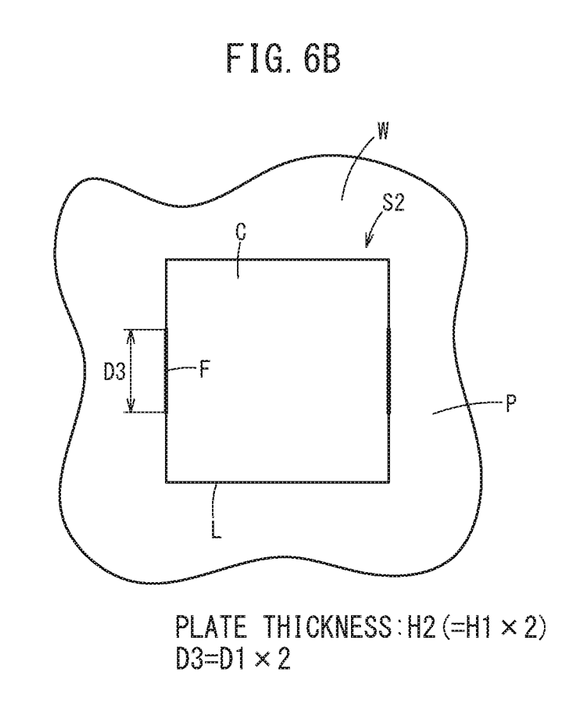
FIG. 6B is a schematic diagram showing a machining shape obtained by enlarging the machining shape of the workpiece defined in the NC program by 2 times.

FIG. 6A is a schematic diagram showing a machining shape S1 in a workpiece W specified in the NC program. FIG. 6B is a schematic diagram showing a machining shape S2 that is obtained by doubling the machining shape S1. Here, it is assumed that the plate thickness H2 of the workpiece W to be machined is twice the plate thickness H1 of the workpiece W set in the NC program.

In the conventional technique, the main processing machine 14 is controlled by reading the NC program replacing the machining shape S1 specified in the NC program with the machining shape S2 that is twice the machining shape S1 while the fixing distance D1 of the fixing portion F specified in the NC program is replaced with a fixing distance D3 that is twice the fixing distance D1.

Here, regarding the weight of the core C, the volume of the core C after the enlargement (FIG. 6B) is eight times greater than that of the core C before enlargement (FIG. 6A), so that the weight of the core C after enlargement (FIG. 6B) is also eight times greater than that of the core C before enlargement (FIG. 6A) if the same material is used for the workpiece W. On the other hand, as to the fixing force of the core C in the fixing portion F, the area of the fixing portion F after the enlargement (the contact area between the fixing portion F and the workpiece W or the core C in FIG. 6B) is four times larger than the area of the fixing portion F before the enlargement (FIG. 6A), the fixing force of the core C at the fixing portion F after enlargement (FIG. 6B) is also four times greater than the fixing force of the core C at the fixing portion F before enlargement (FIG. 6A). That is, the fixing force of the work W at the fixing portion F will not increase enough with respect to the increase in the weight of the core C when the machining shape S1 is enlarged to the machining shape S2. As a result, there is a risk that the core C falls.

To deal with this problem, the control device 12 of the present embodiment is configured such that the control unit 58 reads the NC program according to the enlargement/reduction ratio Ms by which the machining shape S1 specified in the NC program is enlarged or reduced into the machining shape S2 while reading the NC program replacing the fixing distance D1 of the fixing portion F specified in the program with the fixing distance D2, the fixing distance D2 being determined based on both the enlargement/reduction ratio Ms and the plate thickness ratio Mh. As a result, the fixing distance D2 of the fixing portion F can be set in accordance with the weight of the core C in the machining shape S2 after the machining shape S1 is scaled up or down. Therefore, it is possible to appropriately retain the fixing force of the core C at the fixing portion F.

The main processing machine 14 causes discharge between the wire electrode (not shown) and the workpiece W during cutting the workpiece W along the machining line L. In the fixing portion F, the main processing machine changes the condition from that at the time of cutting so as to deposit the component of the wire electrode between the workpiece W and the core C and fix the core C to the workpiece W. However, when the fixing distance D2 of the fixing portion F is shorter than the minimum distance Dmin, the processing conditions are to be switched in a short period of time. However, it is possible that the switching of the processing conditions does not finish and thus a fixing force of the core C at the fixing portion F is not strong enough.

Therefore, the control device 12 of the present embodiment is configured such that the control unit 58 reads the NC program replacing the fixing distance D1 of the fixing portion F specified in the program with the minimum distance Dmin when the fixing distance D2 is shorter than the minimum distance Dmin, and controls the main processing machine 14 based on the new program. As a result, it is possible to secure the time for switching the processing conditions and make the fixing portion F produce a fixing force strong enough to retain the core C.

Second Embodiment

[Configuration of Program Editing Apparatus]

Figure 7:
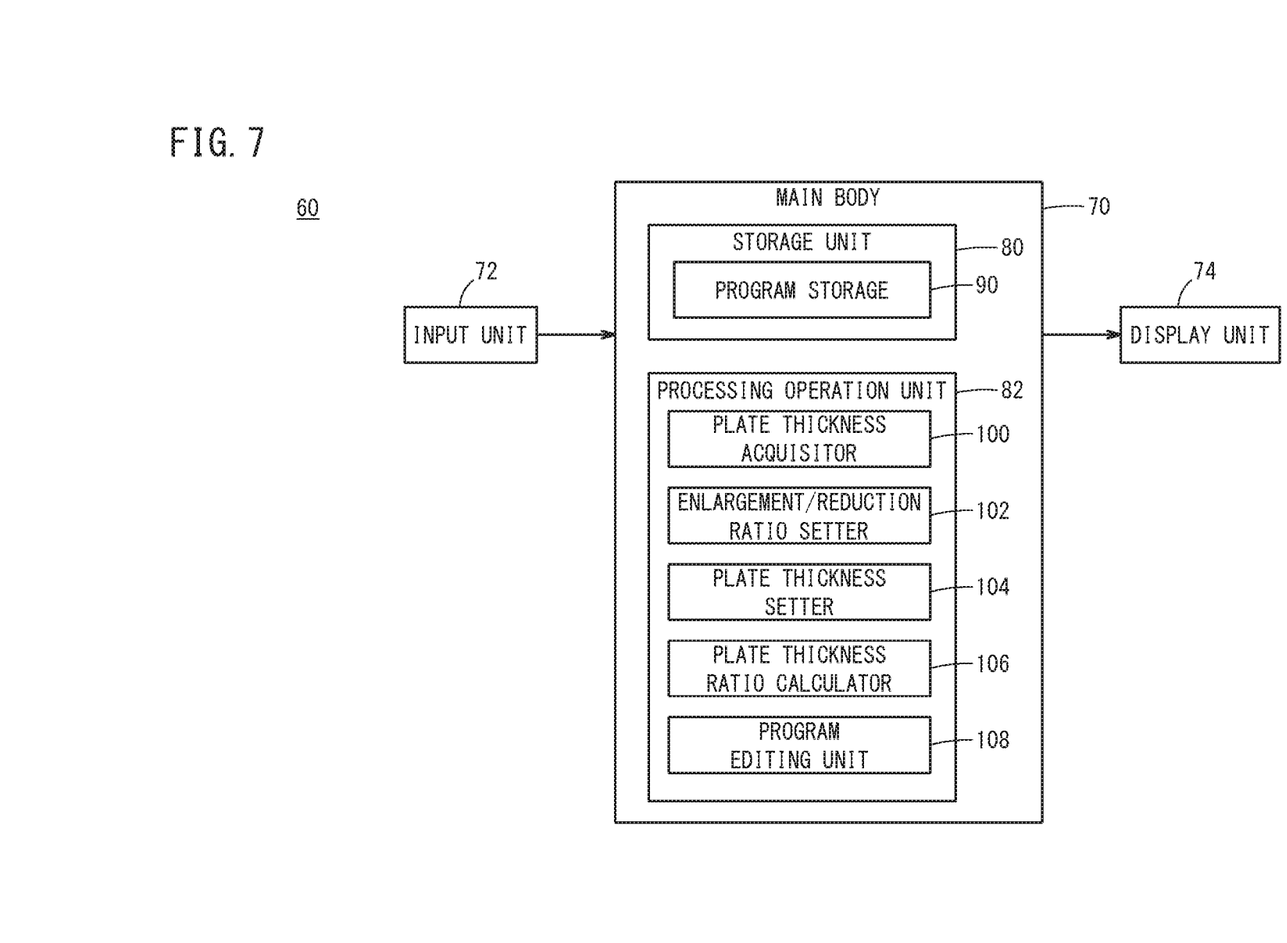
FIG. 7 is a block diagram showing a configuration of a program editing apparatus.

FIG. 7 is a block diagram showing a configuration of a program editing apparatus 60 according to the present embodiment. The program editing apparatus 60 may be a personal computer or the like, and includes a main body 70, an input unit 72, and a display unit 74.

The input unit 72 and the display unit 74 are substantially the same as the input unit 22 and the display unit 24 of the first embodiment. The storage unit 80 of the main body 70 is substantially the same as the storage unit 30 of the first embodiment, and includes a program storage 90 as the storage unit 30 does.

The processing operation unit 82 of the main body 70 is the same as the processing operation unit 32 of the first embodiment in that the processing operation unit 82 includes a plate thickness acquisitor 100, an enlargement/reduction ratio setter 102, a plate thickness setter 104, and a plate thickness ratio calculator 106, but the processing operation unit 82 includes a program editing unit 108 instead of the control unit 58 of the processing operation unit 32.

The program editing unit 108 edits the NC program stored in the program storage 90 in accordance with the enlargement/reduction ratio Ms and the plate thickness ratio Mh. Specifically, the program editing unit 108 edits the NC program so as to specify the machining shape S2 by scaling up or down the machining shape S1 in the NC program by Ms times. Further, the program editing unit 108 edits the NC program so as to specify the fixing distance D2 by multiplying the fixing distance D1 of the fixing portion F specified in the NC program by (Ms×Mh). Further, when the fixing distance D2 is shorter than the minimum distance Dmin, the program editing unit 108 edits the NC program so as to replace the fixing distance D1 in the NC program with the minimum distance Dmin.

[Operation and Effect]

In the program editing apparatus 60 of the present embodiment, the program editing unit 108 edits the NC program so that the machining shape S1 specified in the NC program is replaced by the machining shape S2 corresponding to the enlargement/reduction ratio Ms while the fixing distance D1 of the fixing portion F specified in the program is replaced with the fixing distance D2 corresponding to the enlargement/reduction ratio Ms and the plate thickness ratio Mh. Thereby, in the edited NC program, the fixing distance D2 of the fixing portion F can be set in conformity with the weight of the core C in the machining shape S2 which is a scaled-up or scaled-down machining shape S1.

In the program editing apparatus 60 of the present embodiment, when the fixing distance D2 is shorter than the minimum distance Dmin, the program editing unit 108 edits the NC program so that the fixing distance D1 of the fixing portion F specified in the NC program is replaced with the minimum distance Dmin. As a result, the edited NC program can secure the time for switching between the processing conditions and make the fixing portion F produce a fixing force strong enough to retain the core C.

Other Embodiments

Although the present invention has been described with reference to the embodiments, the technical scope of the present invention is not limited to the range described in the above embodiments. It goes without saying that various modifications or improvements can be added to the above embodiments. It is obvious from the description of the scope of the claims that any mode with such modifications or improvements can be included in the technical scope of the present invention.

For example, in the above embodiments, the NC program has the information on the thickness H1 of the workpiece W specified in the NC program, but the information on the plate thickness H1 may be omitted from the NC program. When the NC program does not have the information on the plate thickness H1, the plate thickness H1 stored in advance in the storage unit 30 of the main body 20 of the control device 12 or the storage unit 80 of the main body 70 of the program editing apparatus 60 may be used.

Further, there are cases where the processing speed of the workpiece W is changed when the plate thickness of the workpiece W is changed. Even if the area of the fixing portion F is the same, the resultant fixing force could become different depending on the processing speed of the workpiece W. Therefore, the fixing distance D2 may be corrected in response to the processing speed of the workpiece W.

Figure 8A:
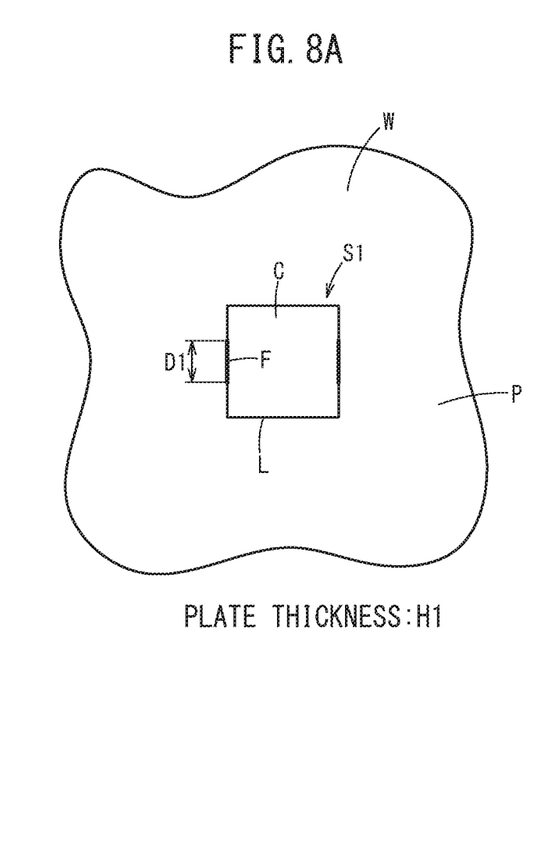
FIG. 8A is a schematic diagram showing a machining shape of a workpiece specified in an NC program.
Figure 8B:
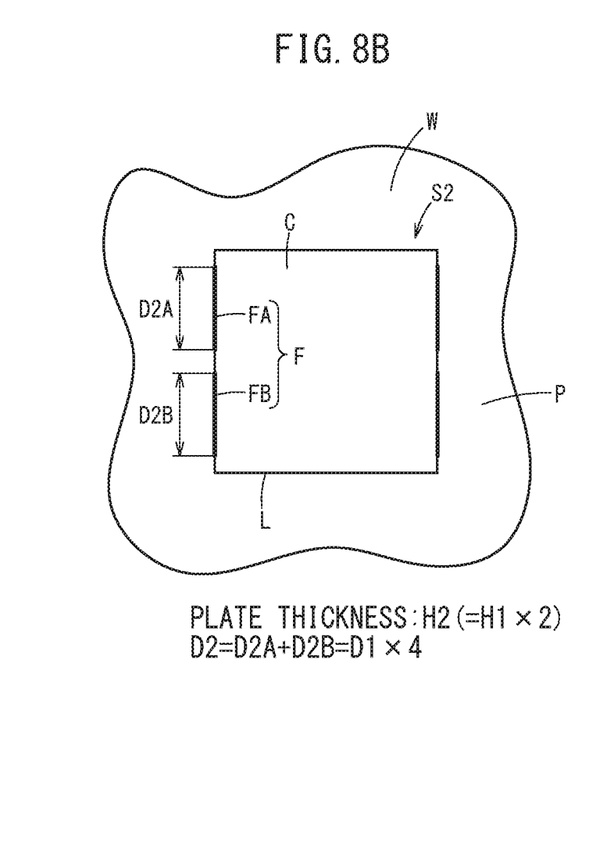
FIG. 8B is a schematic diagram showing a machining shape obtained by enlarging the machining shape of the workpiece defined in the NC program by 2 times.

Further, when the NC program is read as in the above embodiments, the fixing portion F may be divided. FIG. 8A is a schematic diagram showing a machining shape S1 of the workpiece W specified in an NC program. FIG. 8B is a schematic view showing a machining shape S2 that is obtained by scaling up the machining shape S1 by two times. It is assumed that the plate thickness H2 of the workpiece W set in the plate thickness setter 54 is twice the plate thickness H1 of the workpiece W set in the NC program. In this case, it is possible to divide the fixing portion F into the fixing portions FA and FB as shown in FIG. 8B, by specifying the sum of the fixing distance D2A of the fixing portion FA and the fixing distance D2B of the fixing portion FB to be equal to the fixing distance D2.

[Technical Idea Obtained from the Embodiments]

Technical ideas that can be grasped from the above embodiments will be described below.

A control device (12) for controlling a main processing machine (14) in accordance with a program where a plate thickness of a workpiece (W) is a first plate thickness (H1), includes: a program storage unit (40) configured to store a program for specifying a machining shape (S1) on a machining surface (P) of the workpiece (W) and a fixing distance (D1) of a fixing portion (F) that fixes a core (C) to be formed by machining the workpiece (W) to the workpiece (W), on a machining line (L) between the workpiece (W) and the core (C); an enlargement/reduction ratio setter (52) configured to set an enlargement/reduction ratio (Ms) of the machining shape (S1) of the workpiece (W); a plate thickness setter (54) configured to set a second plate thickness (H2) for the plate thickness of the workpiece (W) to be machined by the main processing machine (14); a plate thickness ratio calculator (56) configured to calculate a ratio of the second plate thickness (H2) to the first plate thickness (H1) as a plate thickness ratio (Mh); and a control unit (58) configured to control the main processing machine (14) by reading the program replacing the machining shape (S1) specified in the program with a shape (S2) corresponding to the enlargement/reduction ratio (Ms) and replacing the fixing distance (D1) specified in the program with a distance (D2) corresponding to the enlargement/reduction ratio (Ms) and the plate thickness ratio (Mh). This configuration makes it possible to set the fixing distance (D2) of the fixing portion (F) in conformity with the weight of the core (C) in the machining shape (S2) after the machining shape (S1) is scaled up or down, and it is possible to appropriately set the fixing force of the core (C) in the fixing portion (F).

In the above control device (12), when the distance corresponding to the enlargement/reduction ratio (Ms) and the plate thickness ratio (Mh) is designated as D2, D2 may be defined as D2=Ms×Mh×D1, where D1 is the fixing distance specified in the program, Ms the enlargement/reduction ratio, and Mh the plate thickness ratio. This configuration makes it possible to set the fixing distance (D2) of the fixing portion (F) according to the weight of the core (C) in the machining shape (S2) after the machining shape (S1) is scaled up or down, so that it is possible to appropriately set the fixing force of the core (C) in the fixing portion (F).

In the above control device (12), the control unit (58) may be configured to control the main processing machine (14) by replacing the fixing distance (D1) specified in the program with a predetermined distance (Dmin) when the converted fixing distance (D2) is equal to or shorter than a predetermined distance (Dmin). As a result, it is possible to secure the time for switching the processing conditions and make the fixing portion (F) produce a fixing force strong enough to retain the core (C).

A wire electrical discharge machine (10) for performing electrical discharge machining on the workpiece (W) by means of the main processing machine (14) includes the above-described control device (12). As a result, in machining the workpiece (W) by the wire electrical discharge machine (10), it is possible to prevent the core (C) from falling, thanks to the fixing place (F).

A program editing apparatus (60) for editing a program where a plate thickness of the workpiece (W) is a first plate thickness (H1), includes: a program storage unit (90) configured to store a program for specifying a machining shape (S1) on a machining surface (P) of the workpiece (W) and a fixing distance (D1) of a fixing portion (F) that fixes a core (C) to be formed by machining the workpiece (W) to the workpiece (W), on a machining line (L) between the workpiece (W) and the core (C); an enlargement/reduction ratio setter (102) configured to set an enlargement/reduction ratio (Ms) of the machining shape (S1) of the workpiece (W); a plate thickness setter (104) configured to set a second plate thickness (H2) as the plate thickness of the workpiece (W); a plate thickness ratio calculator (106) configured to calculate the ratio of the second plate thickness (H2) to the first plate thickness (H1) as a plate thickness ratio (Mh); and a program editing unit (108) configured to edit the program so that the machining shape (S1) specified in the program is replaced with a shape corresponding to the enlargement/reduction ratio (Ms) and the fixing distance (D1) specified in the program is replaced with a distance (D2) corresponding to the enlargement/reduction ratio (Ms) and the plate thickness ratio (Mh). Thus, in the edited NC program, it is possible to set the fixing distance (D2) of the fixing portion (F) in accordance with the weight of the core (C) in the machining shape (S2) after the machining shape (S1) is scaled up or down.

In the above program editing apparatus (60), when the distance corresponding to the enlargement/reduction ratio (Ms) and the plate thickness ratio (Mh) is designated as D2, the program editing unit (108) may be configured to define D2 as: D2=Ms×Mh×D1, where D1 is the fixing distance specified in the program, Ms the enlargement/reduction ratio, and Mh the plate thickness ratio. This configuration makes it possible to set the fixing distance (D2) of the fixing portion (F) in accordance with the weight of the core (C) in the machining shape (S2) after the machining shape (S1) is scaled up or down, so that it is possible to appropriately set the fixing force of the core (C) in the fixing portion (F).

In the above program editing apparatus (60), the program editing unit (108) may be configured to edit the program so that the fixing distance (D1) specified in the program is replaced with a predetermined distance (Dmin) when the edited fixing distance (D2) is equal to or shorter than a predetermined distance (Dmin). As a result, in the edited NC program, it is possible to secure the time for switching the processing conditions and make the fixing portion (F) produce a fixing force strong enough to retain the core (C).

A control method for controlling a main processing machine (14) in accordance with a program where a plate thickness of the workpiece (W) is a first plate thickness (H1), the program specifying a machining shape (S1) on a machining surface (P) of the workpiece (W) and a fixing distance (D1) of a fixing portion (F) that fixes a core (C) to be formed by machining the workpiece (W) to the workpiece (W), on a machining line (L) between the workpiece (W) and the core (C), includes the steps of: setting an enlargement/reduction ratio (Ms) of the machining shape (S1) of the workpiece (W); setting a second plate thickness (H2) as the plate thickness of the workpiece (W) to be processed by the main processing machine (14); calculating a ratio of the second plate thickness (H2) to the first plate thickness (H1) as a plate thickness ratio (Mh); and controlling the main processing machine (14) by replacing the machining shape (S1) specified in the program with a shape (S2) corresponding to the enlargement/reduction ratio (Ms) and replacing the fixing distance (D1) specified in the program with a distance (D2) corresponding to the enlargement/reduction ratio (Ms) and the plate thickness ratio (Mh). This configuration makes it possible to set the fixing distance (D2) of the fixing portion (F) in accordance with the weight of the core (C) in the machining shape (S2) after the machining shape (S1) is scaled up or down, so that it is possible to appropriately set the fixing force of the core (C) in the fixing portion (F).

In the above control method, when the distance corresponding to the enlargement/reduction ratio (Ms) and the plate thickness ratio (Mh) is designated as D2, D2 may be defined as: D2=Ms×Mh×D1, where D1 is the fixing distance specified in the program, Ms the enlargement/reduction ratio, and Mh the plate thickness ratio. This configuration makes it possible to set the fixing distance (D2) of the fixing portion (F) in accordance with the weight of the core (C) in the machining shape (S2) after the machining shape (S1) is scaled up or down, so that it is possible to appropriately set the fixing force of the core (C) in the fixing portion (F).

In the above control method, the main processing machine (14) may be controlled by replacing the fixing distance (D1) specified in the program with a predetermined distance (Dmin) when the converted fixing distance (D2) is equal to or shorter than a predetermined distance (Dmin). As a result, in machining the workpiece (W) with the wire electrical discharge machine (10), it is possible to prevent the core (C) from falling, thanks to the fixing place (F).

What is claimed is:

1. A control device for controlling a main processing machine in accordance with a program where a plate thickness of a workpiece is a first plate thickness, comprising:
   a program storage unit configured to store a program for specifying a machining shape on a machining surface of the workpiece and a fixing distance of a fixing portion that fixes a core to be formed by machining the workpiece to the workpiece, on a machining line between the workpiece and the core;
   an enlargement/reduction ratio setter configured to set an enlargement/reduction ratio of the machining shape of the workpiece;
   a plate thickness setter configured to set a second plate thickness as the plate thickness of the workpiece to be machined by the main processing machine;
   a plate thickness ratio calculator configured to calculate the ratio of the second plate thickness to the first plate thickness as a plate thickness ratio; and
   a control unit configured to control the main processing machine by reading the program replacing the machining shape specified in the program with a shape corresponding to the enlargement/reduction ratio and replacing the fixing distance specified in the program with a distance corresponding to the enlargement/reduction ratio and the plate thickness ratio.

2. The control device according to claim 1, wherein when the distance corresponding to the enlargement/reduction ratio and the plate thickness ratio is designated as D2, D2 is defined as:

$$D2=Ms \times Mh \times D1,$$

where D1 is the fixing distance specified in the program, Ms is the enlargement/reduction ratio, and Mh is the plate thickness ratio.

3. The control device according to claim 1, wherein the control unit is configured to control the main processing machine by replacing the fixing distance specified in the program with a predetermined distance when the converted fixing distance is equal to or shorter than a predetermined distance.

4. A wire electrical discharge machine comprising the control device according to claim 1, and causing the main processing machine to perform electrical discharge machining on the workpiece.

5. A program editing apparatus for editing a program where a plate thickness of a workpiece is a first plate thickness, comprising:
   a program storage unit configured to store a program for specifying a machining shape on a machining surface of the workpiece and a fixing distance of a fixing portion that fixes a core to be formed by machining the workpiece to the workpiece, on a machining line between the workpiece and the core;
   an enlargement/reduction ratio setter configured to set an enlargement/reduction ratio of the machining shape of the workpiece;
   a plate thickness setter configured to set a second plate thickness as the plate thickness of the workpiece;
   a plate thickness ratio calculator configured to calculate a ratio of the second plate thickness to the first plate thickness as a plate thickness ratio; and
   a program editing unit configured to edit the program replacing the machining shape specified in the program with a shape corresponding to the enlargement/reduction ratio and replacing the fixing distance specified in the program with a distance corresponding to the enlargement/reduction ratio and the plate thickness ratio.

6. The program editing apparatus according to claim 5, wherein when the distance corresponding to the enlargement/reduction ratio and the plate thickness ratio is designated as D2, the program editing unit is configured to specify D2 as:

$$D2 = Ms \times Mh \times D1,$$

where D1 is the fixing distance specified in the program, Ms is the enlargement/reduction ratio, and Mh is the plate thickness ratio.

7. The program editing apparatus according to claim 5, wherein the program editing unit is configured to edit the program so that the fixing distance specified in the program is replaced with a predetermined distance when the edited fixing distance is equal to or shorter than a predetermined distance.

8. A control method for controlling a main processing machine in accordance with a program where a plate thickness of a workpiece is a first plate thickness, the program specifying a machining shape on a machining surface of the workpiece and a fixing distance of a fixing portion that fixes a core to be formed by machining the workpiece to the workpiece, on a machining line between the workpiece and the core,
   the control method comprising the steps of:
   setting an enlargement/reduction ratio of the machining shape of the workpiece;
   setting a second plate thickness as the plate thickness of the workpiece to be processed by the main processing machine;
   calculating a ratio of the second plate thickness to the first plate thickness as a plate thickness ratio; and
   controlling the main processing machine by replacing the machining shape specified in the program with a shape corresponding to the enlargement/reduction ratio and replacing the fixing distance specified in the program with a distance corresponding to the enlargement/reduction ratio and the plate thickness ratio.

9. The control method according to claim 8, wherein when the distance corresponding to the enlargement/reduction ratio and the plate thickness ratio is designated as D2, D2 is specified as:

$$D2 = Ms \times Mh \times D1,$$

where D1 is the fixing distance specified in the program, Ms is the enlargement/reduction ratio, and Mh is the plate thickness ratio.

10. The control method according to claim 8, wherein the main processing machine is controlled by replacing the fixing distance specified in the program with a predetermined distance when the converted fixing distance is equal to or shorter than a predetermined distance.

* * * * *